United States Patent
Day

(10) Patent No.: US 8,739,597 B2
(45) Date of Patent: Jun. 3, 2014

(54) APPARATUS AND METHOD FOR PROVING AT LOW TEMPERATURES

(75) Inventor: Donald Day, Cypress, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 158 days.

(21) Appl. No.: 12/990,129

(22) PCT Filed: Apr. 29, 2009

(86) PCT No.: PCT/US2009/042116
§ 371 (c)(1),
(2), (4) Date: Oct. 28, 2010

(87) PCT Pub. No.: WO2009/134890
PCT Pub. Date: Nov. 5, 2009

(65) Prior Publication Data
US 2011/0036178 A1  Feb. 17, 2011

Related U.S. Application Data

(60) Provisional application No. 61/049,110, filed on Apr. 30, 2008.

(51) Int. Cl.
G01F 25/00 (2006.01)

(52) U.S. Cl.
USPC .......................................................... 73/1.22

(58) Field of Classification Search
None
See application file for complete search history.

(56) References Cited

U.S. PATENT DOCUMENTS

| 3,403,544 | A | * | 10/1968 | Francisco, Jr. | 73/1.21 |
| 3,552,063 | A | * | 1/1971 | Thielenhaus | 451/65 |
| 3,580,045 | A | * | 5/1971 | Pfrehm | 73/1.19 |
| 4,475,377 | A | * | 10/1984 | Halpine | 73/1.17 |
| 5,781,116 | A | * | 7/1998 | Hedger et al. | 340/606 |
| 6,789,407 | B1 | * | 9/2004 | Poston et al. | 73/1.18 |
| 6,910,429 | B1 | * | 6/2005 | Matay et al. | 108/44 |
| 7,619,226 | B2 | * | 11/2009 | Beinhocker | 250/474.1 |
| 2003/0231549 | A1 | * | 12/2003 | Shiraishi et al. | 367/152 |
| 2006/0156828 | A1 | | 7/2006 | Konzelmann et al. | |
| 2007/0169536 | A1 | | 7/2007 | Cotton | |
| 2007/0234778 | A1 | | 10/2007 | Swanek | |

FOREIGN PATENT DOCUMENTS

| JP | 2002-459073 | * | 5/2002 |
| WO | 84/02185 A1 | | 6/1984 |
| WO | 93/15381 A1 | | 8/1993 |

OTHER PUBLICATIONS

International Application No. PCT/US2009/042116 Search Report and Written Opinion dated Nov. 17, 2009.

* cited by examiner

Primary Examiner — Robert R Raevis
(74) Attorney, Agent, or Firm — Conley Rose, P.C.

(57) ABSTRACT

Apparatus and methods for proving a flow meter at low temperatures. A flow meter measuring low temperature fluids (e.g., less than about −50° F., or less than about −220° F.) must still be proved. Low temperature fluids can be destructive to piston or compact provers, or may require indirect proving methods. The apparatus disclosed is a low temperature prover directly coupled into the pipeline carrying the low temperature fluids. In some embodiments, a magnetic pickup coil and a magnetic member communicate between the displacer and the flow tube. The magnetic target member may be carbon-free. In some embodiments, a pair of ultrasonic transceivers coupled to the flow tube communicate a signal across the flow tube and a displacer is moveable to interrupt the signal. In some embodiments, the flow tube includes an inner surface having a microfinish for lubrication. The displacer may be a piston rotatable while being moved axially.

22 Claims, 6 Drawing Sheets

US 8,739,597 B2

APPARATUS AND METHOD FOR PROVING AT LOW TEMPERATURES

CROSS-REFERENCE TO RELATED APPLICATION

This application is the U.S. National Stage under 35 U.S.C. §371 of International Patent Application No. PCT/US2009/042116 filed Apr. 29, 2009, which claims the benefit of U.S. Provisional Patent Application No. 61/049,110 filed Apr. 30, 2008, entitled "Apparatus and Method For Proving At Low Temperatures."

STATEMENT REGARDING FEDERALLY SPONSORED RESEARCH OR DEVELOPMENT

Not applicable.

BACKGROUND

After hydrocarbons have been removed from the ground, the fluid stream (such as crude oil or natural gas) is transported from place to place via pipelines. It is desirable to know with accuracy the amount of fluid flowing in the stream, and particular accuracy is demanded when the fluid is changing hands, or "custody transfer." Custody transfer can occur at a fluid fiscal transfer measurement station or skid, which may include key transfer components such as a measurement device or flow meter, a proving device, associated pipes and valves, and electrical controls. Measurement of the fluid stream flowing through the overall delivery pipeline system starts with the flow meter, which may include a turbine meter, a positive displacement meter, an ultrasonic meter, a coriolis meter or a vortex meter.

Flow characteristics of the fluid stream can change during product delivery that can affect accurate measurement of the product being delivered. Typically, changes of pressure, temperature and flow rate are acknowledged by operator intervention. These changes are represented as changes in the flow characteristics, and are normally verified by the operator via the effects of the changes and their effect on the measurement device. Normally, this verification is conducted by proving the meter with a proving device, or prover. A calibrated prover, adjacent the measurement device on the skid and in fluid communication with the measurement device, is sampled and the sampled volumes are compared to the throughput volumes of the measurement device. If there are statistically important differences between the compared volumes, the throughput volume of the measurement device is adjusted to reflect the actual flowing volume as identified by the prover.

The prover has a precisely known volume which is calibrated to known and accepted standards of accuracy, such as those prescribed by the American Petroleum Institute (API) or the internationally accepted ISO standards. The precisely known volume of the prover can be defined as the volume of product between two detector switches that is displaced by the passage of a displacer, such as an elastomeric sphere or a piston. The known volume that is displaced by the prover is compared to the throughput volume of the meter. If the comparison yields a volumetric differential of zero or an acceptable variation therefrom, the flow meter is then said to be accurate within the limits of allowed tolerances. If the volumetric differential exceeds the limits allowed, then evidence is provided indicating that the flow meter may not be accurate. Then, the meter throughput volume can be adjusted to reflect the actual flowing volume as identified by the prover. The adjustment may be made with a meter correction factor.

One type of meter is a pulse output meter, which may include a turbine meter, a positive displacement meter, an ultrasonic meter, a coriolis meter or a vortex meter. By way of example, FIG. 1 illustrates a system 10 for proving a meter 12, such as a turbine meter. A turbine meter, based on turning of a turbine-like structure within the fluid stream 11, generates electrical pulses 15 where each pulse is proportional to a volume, and the rate of pulses proportional to the volumetric flow rate. The meter 12 volume can be related to a prover 20 volume by flowing a displacer in the prover 20. Generally, the displacer is forced first past an upstream detector 16 then a downstream detector 18 in the prover 20. The volume between detectors 16, 18 is a calibrated prover volume. The flowing displacer first actuates or trips the detector 16 such that a start time $t_{16}$ is indicated to a processor or computer 26. The processor 26 then collects pulses 15 from the meter 12 via signal line 14. The flowing displacer finally trips the detector 18 to indicate a stop time $t_{18}$ and thereby a series 17 of collected pulses 15 for a single pass of the displacer. The number 17 of pulses 15 generated by the turbine meter 12 during the single displacer pass, in both directions, through the calibrated prover volume is indicative of the volume measured by the meter during the time $t_{16}$ to time $t_{18}$. Multiple displacer passes are required to attain the prover volume. By comparing the prover volume to the volume measured by the meter, the meter may be corrected for volume throughput as defined by the prover.

FIG. 2 illustrates another system 50 for proving an ultrasonic flow meter 52, using transit time technology. The system 50 also includes a prover 20 and a processor 26. By ultrasonic it is meant that ultrasonic signals are sent back and forth across the fluid stream 51, and based on various characteristics of the ultrasonic signals a fluid flow may be calculated. Ultrasonic meters generate flow rate data in batches where each batch comprises many sets of ultrasonic signals sent back and forth across the fluid, and thus where each batch spans a period of time (e.g., one second). The flow rate determined by the meter corresponds to an average flow rate over the batch time period rather than a flow rate at a particular point in time.

In a particular embodiment of the prover 20, and with reference to FIG. 3, a piston or compact prover 100 is shown. A piston 102 is reciprocally disposed in a flow tube 104. A pipe 120 communicates a flow 106 from a primary pipeline to an inlet 122 of the flow tube 104. The flow 108 of the fluid forces the piston 102 through the flow tube 104, and the flow eventually exits the flow tube 104 through an outlet 124. The flow tube 104 and the piston 102 may also be connected to other components, such as a spring plenum 116 that may have a biasing spring for a poppet valve in the piston 102. A chamber 118 may also be connected to the flow tube 104 and the piston 102 having optical switches for detecting the position of the piston 102 in the flow tube 104. A hydraulic pump and motor 110 is also shown coupled to the flow line 120 and the plenum 116. A hydraulic reservoir 112, a control valve 114 and a hydraulic pressure line 126 are also shown coupled to the plenum 116. As will be shown below, the piston 102 can be adapted according to the principles taught herein.

In some applications, the fluids flowing in the pipelines (primary pipelines and those of the measurement station) are maintained at low temperatures. As used herein, low temperatures, for example, are generally less than about −50° F., alternatively less than about −60° F., alternatively less than about −220° F., and alternatively less than about −250° F.

These low temperatures may also be referred to as very low temperatures or cryogenic temperatures. Examples of fluids maintained at low temperatures include liquid natural gas (LNG), liquefied petroleum gas (LPG) and liquid nitrogen. Low temperatures of the metered fluids cause numerous problems, such as unsuitability of the prover's sensing devices, wear on components such as seals, and reduced lubrication on the flow tube's inner surface for the low temperature fluids, which tend to be non-lubricating. Carbon steel reacts negatively to low temperature product flowing in the pipeline.

To address these problems, meters operating in very low temperatures are proved by indirect proving methods. Generally, indirect proving is accomplished by proving a meter suitable for very low temperature service using a prover that is not rated for very low temperature service. First, a fluid, generally water, is flowed through a proving meter, and the proving meter is proved in the normal way to establish a meter factor for the proving meter. The proving meter is then used on actual flowing low temperature product to obtain the meter factor for the meter measuring the low temperature product. Consequently, the proving meter is calibrated using a fluid unlike the actual product delivered through the meter (at least with regard to density), leading to incorrect results in the actual product meter to be calibrated.

Thus, there is a need for a prover adapted for very low temperatures, at least to increase durability of the prover and to provide direct proving of very low temperature products.

BRIEF DESCRIPTION OF THE DRAWINGS

For a detailed description of exemplary embodiments, reference will now be made to the accompanying drawings in which.

DETAILED DESCRIPTION

Figure 1:
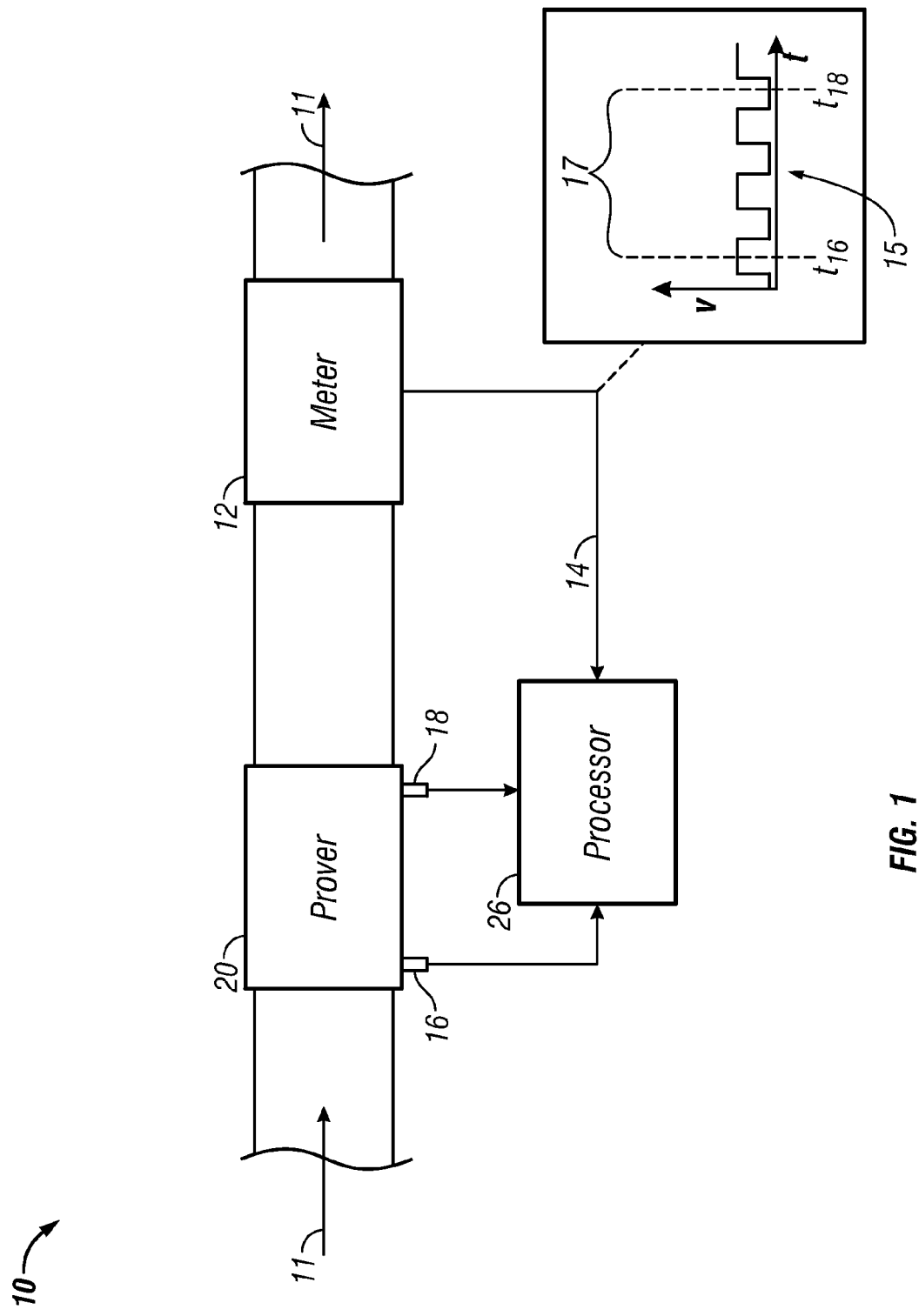
FIG. 1 is a schematic representation of a system for proving a meter, such as a turbine meter.
Figure 2:
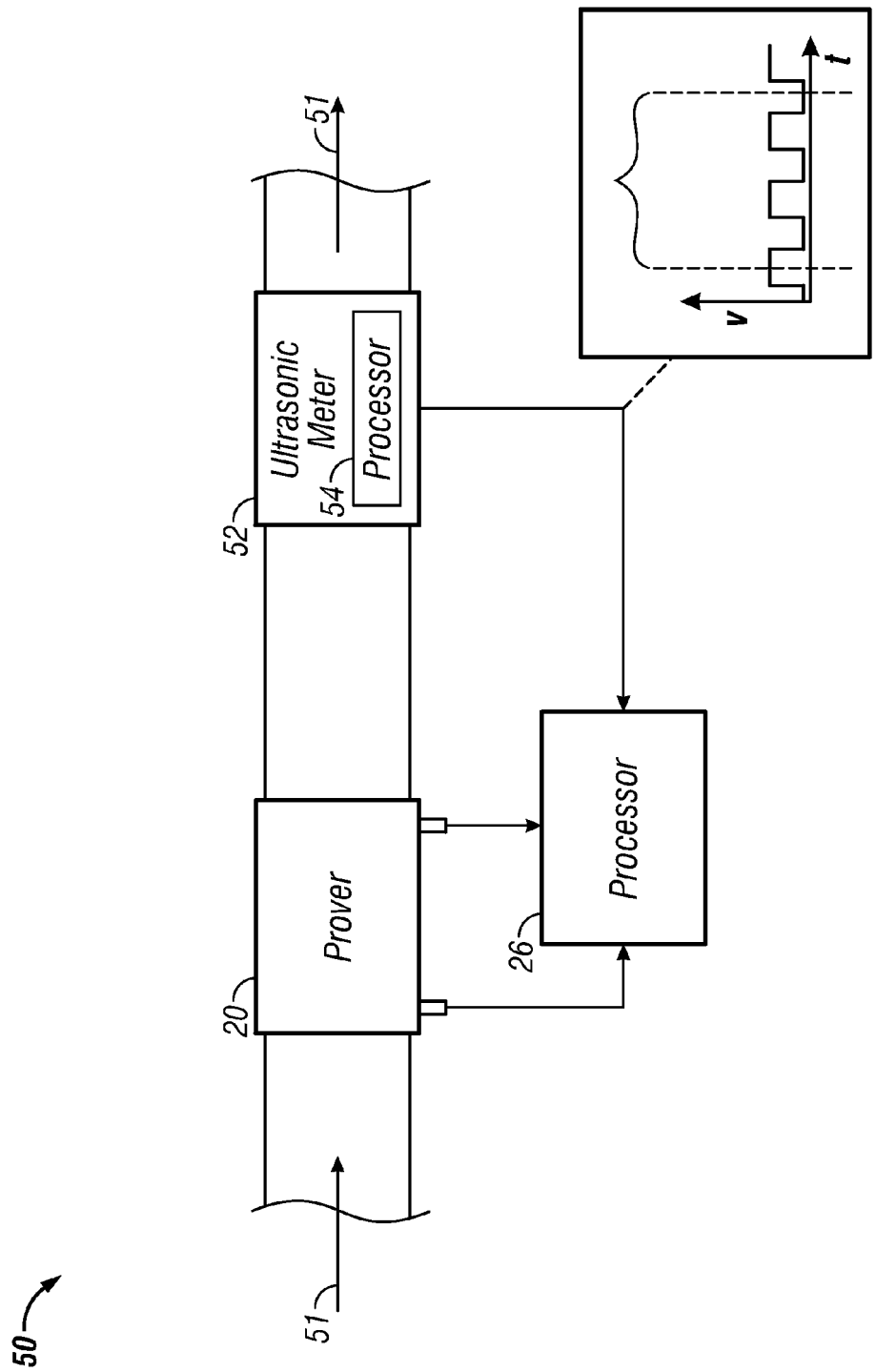
FIG. 2 is a schematic representation of another system for proving a meter, such as an ultrasonic meter.

In the drawings and description that follow, like parts are typically marked throughout the specification and drawings with the same reference numerals. The drawing figures are not necessarily to scale. Certain features of the invention may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The term "fluid" may refer to a liquid or gas and is not solely related to any particular type of fluid such as hydrocarbons. The terms "pipe", "conduit", "line" or the like refers to any fluid transmission means. The various characteristics mentioned above, as well as other features and characteristics described in more detail below, will be readily apparent to those skilled in the art upon reading the following detailed description of the embodiments, and by referring to the accompanying drawings.

The embodiments described herein include a prover, such as a piston-type pipe prover, that is adapted for use with low temperature fluids. Particularly, the prover is used with fluids at low temperatures less than −50° F. More particularly, the prover is used with fluids at low temperatures less than −200° F. There is presented herein various combinations of components and principles which provide the cryogenic prover, or methods of direct proving of liquids at extremely low temperatures. For example, a sensing device in the prover is improved for low temperatures, such as by adjusting material components or replacing sensors. In some embodiments, the surface finish of the inner surface of the flow tube is improved for lubricating non-lubrous LNG and LPG products. In further embodiments, a piston rotator is provided to prevent deterioration of piston seals.

Figure 3:
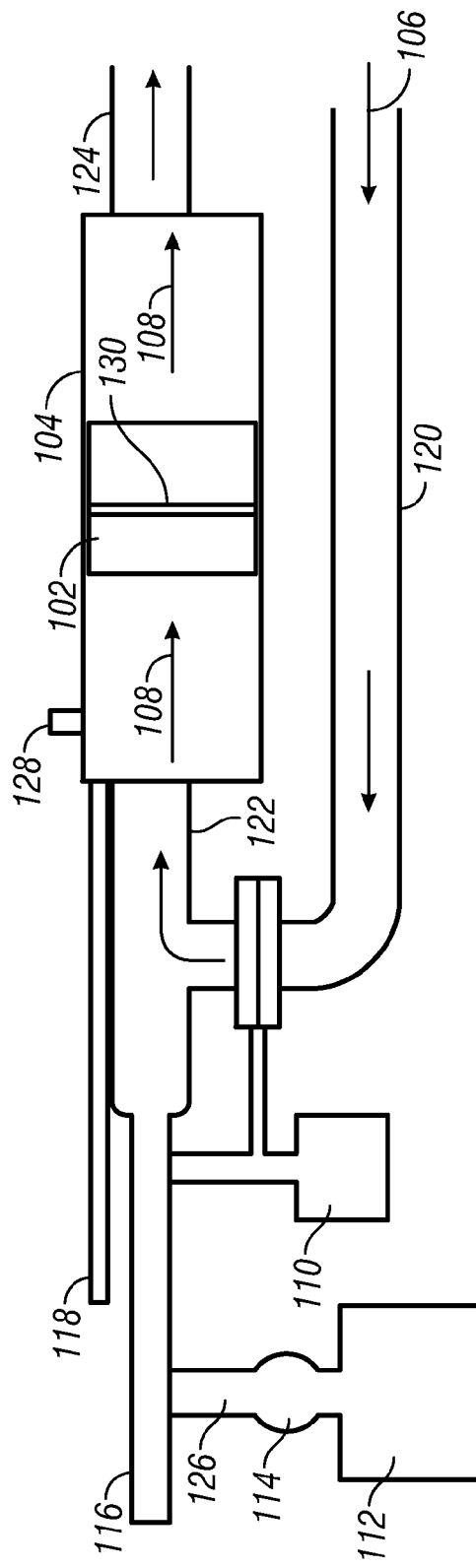
FIG. 3 is a schematic representation of a bi-directional piston-type prover.

Referring initially to FIG. 3, the prover 100 may alternatively include a detection member or target ring 130, disposable at various locations along the axial length of the piston 102. The flow tube 104 includes a sensor 128, also disposable at various locations along the axial length of the flow tube 104, for detecting passage of the target ring 130. The target ring 130 is the trip instigator for entry into and exit from the calibrated measuring section of the flow tube 104 of the prover 100. At very low temperatures, proper communication between the sensor 128 and the target ring 130 is negatively affected due to, for example, the unsuitability of the detector 128 or the materials of the target ring 130 at very low temperatures.

Figure 4:
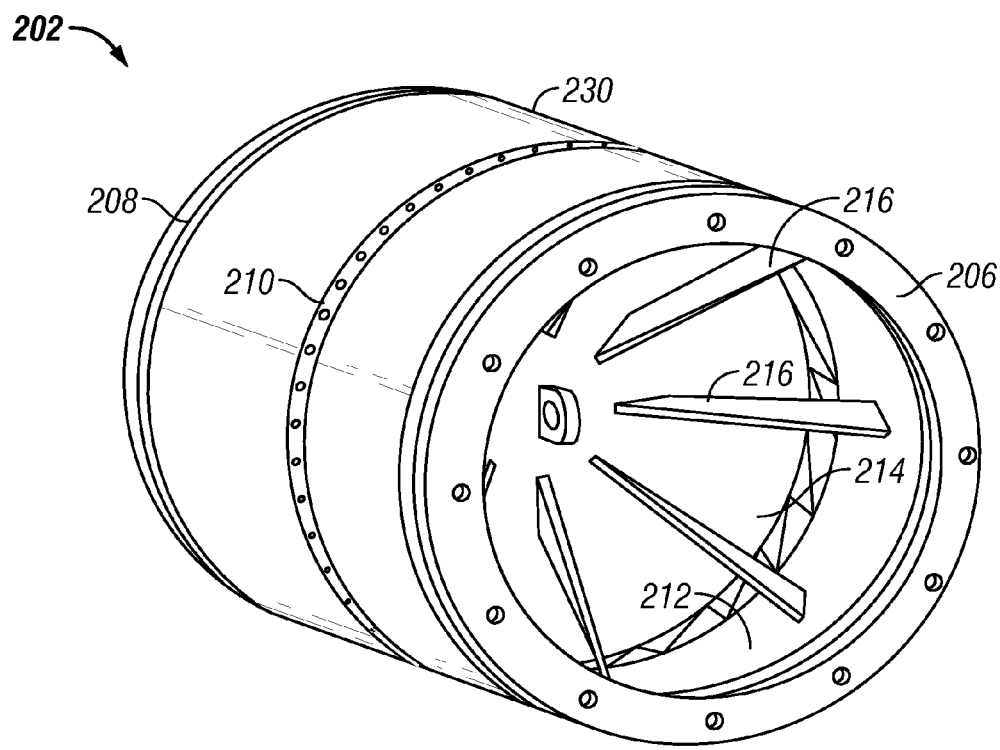
FIG. 4 is a piston in accordance with the teachings herein.

Referring now to FIG. 4, an embodiment of a prover piston 202 is shown. The piston 202 may be used in a variety of provers, such as prover 100. The piston 202 is especially suited for a bi-directional prover. The piston 202 includes a body 230 with ends 206, 208. A middle portion of the body 230 includes a ring 210 coupled thereto. An inner portion of the piston body 230 includes an inner surface 212 with a plate 214 extending therebetween, generally perpendicular to the longitudinal axis of the piston 202. A first set of vanes 216 extends from the plate 214. The vanes 216 generally extend perpendicular to the plate 214, but also at an angle to the plate 214 such that the vanes may receive a fluid acting on the plate 214 and redirect a force applied to the plate 214. The angle of the vanes relative to the plate 214 is variable. In some embodiments, a second set of vanes is similarly disposed on an opposite side of the plate 214 to effect the same functions in a bi-directional manner.

Figure 5:
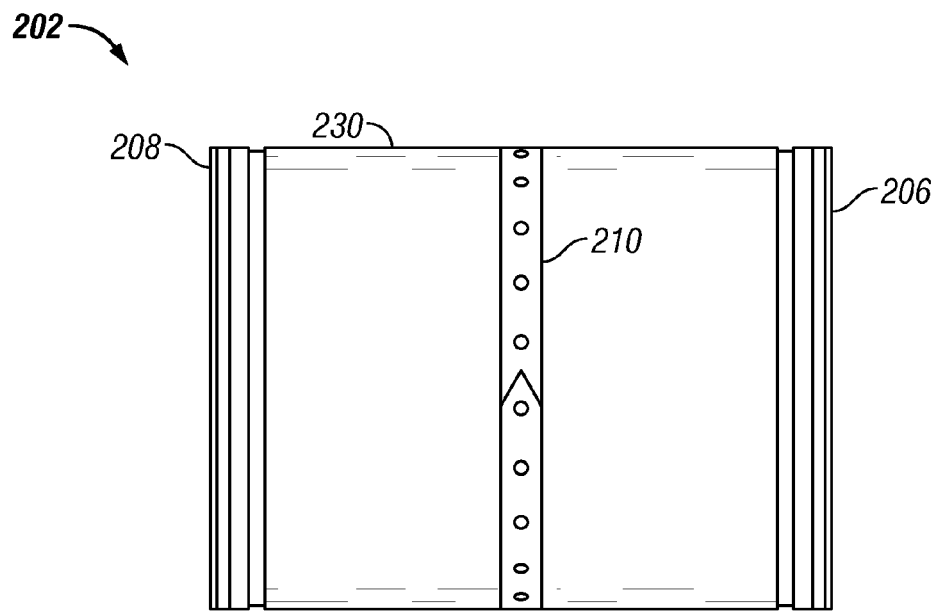
FIG. 5 is a side view of the piston of FIG. 4.

Referring briefly to FIG. 5, a side view of the piston 202 is shown illustrating the body 230 having the ends 206, 208 and the ring 210.

In some embodiments, the ring 210 is the target ring associated with the piston 202. In some embodiments, the ring 210 includes materials having magnetic properties. In certain embodiments, the ring 210 comprises carbon-free materials. In exemplary embodiments, the ring 210 comprises high mu (μ) metal. In exemplary embodiments, the ring 210 comprises HYMU or HYMU 80 metal components. In exemplary embodiments, the ring 210 comprises various combinations of nickel, iron, copper and/or molybdenum. The attachment of the target ring 210 to the piston 202 is designed to allow expansion and contraction of the target ring 210 such that it can expand and contract yet maintain a constant physical relationship not exceeding one in ten thousand repeatability.

Figure 7:
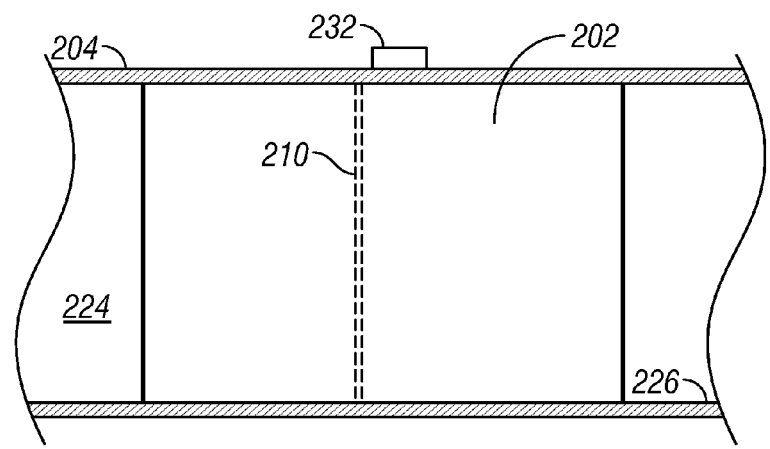
FIG. 7 is a schematic of a piston in a prover flow tube in accordance with the teachings herein.

With reference to FIG. 7, a flow tube 204 containing the piston 202 may include a magnetic pickup coil 232 mounted thereon. The piston 202 is moveably and reciprocally disposed in a flow passage 224 of the flow tube 204 such the piston 202 can pass the magnetic pickup coil 232 in a bi-directional manner. As the target ring 210 passes the pickup coil 232, the ring and coil communicate via the magnetic reluctance principle. The target ring 210 provides the magnetic force flux which is received by the pickup coil 232. The target ring 210 passes in a pre-determined proximity, referred to as the air gap, and causes a deflection in the existing magnetic field of the pickup coil 232. The change in reluctance of the resulting magnetic circuit generates a voltage pulse, which is then transmitted to a preamplifier. The preamplifier strengthens the signal, which is used to trigger a prover computer, such as those disclosed herein, to collect meter pulses from the meter which is being proven.

Figure 8:
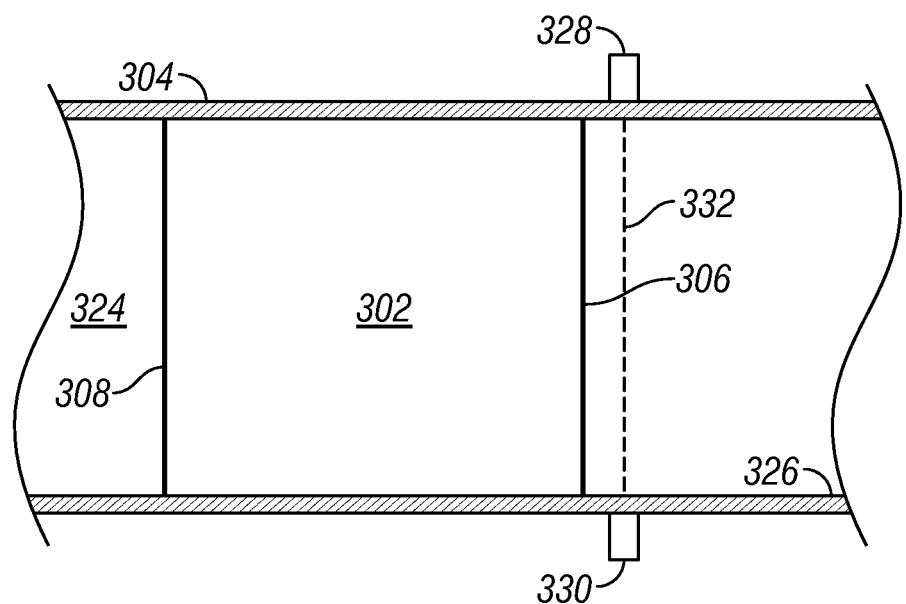
FIG. 8 is a schematic of an alternative embodiment of the piston and prover of FIG. 7.

In another embodiment, and with reference to FIG. 8, a sensing assembly comprising a pair of ultrasonic transceivers 328, 330 is mounted on a flow tube 304 of a piston or compact prover. The transceivers 328, 330 may also be referred to as ultrasonic speed of sound transceivers. A piston assembly 302 is bi-directionally moveable in a flow passage 324 of the flow tube 304. The transceivers 328, 330 communicate via a straight line sonic signal 332. When the leading edge of the piston 302, whether it be the end 306 or the end 308, aligns with the transceivers 328, 330, the signal 332 is interrupted. Interruption of the signal 332 triggers a prover computer, causing operation of the remainder of the prover and prover computer in the normal way and consistent with the teachings herein. In additional embodiments, the transceivers 328, 330 include inductive type linear displacement transducers, or are adapted to transmit other interruptable signals 332 such as laser beam, LED beam, or radar beam.

Still referring to FIGS. 7 and 8, the flow passages 224 and 324 include inner surfaces 226, 326, respectively. Typically, the prover flow tube or barrel comprises piping material well defined by applicable material specifications. The internal finish of the prover barrel, such as those on surfaces 226, 326, is normally graphite impregnated epoxy applied by conventional spray paint methodology. Due to the non-lubricity of certain hydrocarbon products to be proved, such as butanes, propanes and LPG's, the coating on the finished inner surfaces assists the displacer piston in moving smoothly through the prover barrel. This is a requirement for consistent and accurate proving. However, these coatings are not suitable for the lower temperatures defined herein. Thus, the surfaces 226, 326 of the embodiments of FIGS. 7 and 8 include a microfinish. The microfinish of the surfaces 226, 326 allows a microscopic film of product to be maintained at the surfaces 226, 326, thereby maximizing the already low degree of lubrication the product is able to inherently afford. In exemplary embodiments, the microfinishes applied to the surfaces 226, 326 include approximately 32 microinch to 16 microinch obtained by honing, milling or grinding.

Figure 6:
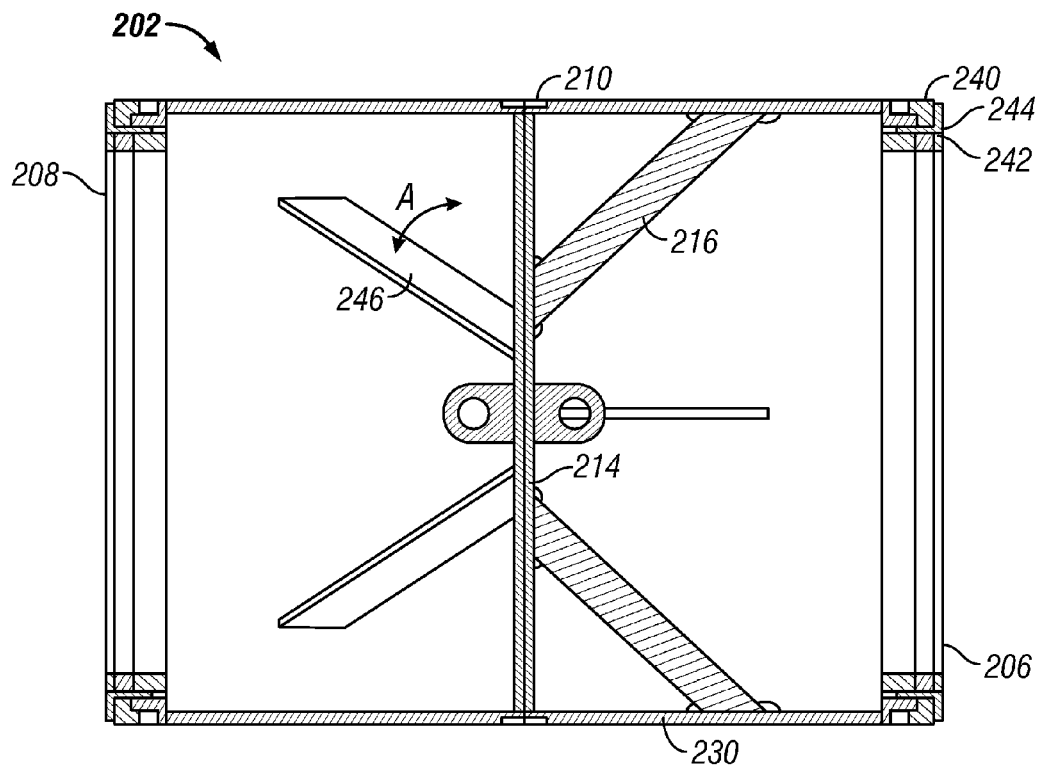
FIG. 6 is a cross-section view of the piston of FIGS. 4 and 5.

Referring now to FIG. 6, a cross-section taken along an axial length of the prover piston 202 is shown. The piston body 230 includes at its end 206 a first ring 240, a second ring 242 and a socket 244, primarily for assembly purposes. The rings 240, 242 provide alternative locations for the target ring as described herein to be disposed, in addition to the location described with respect to target ring 210. The first set of vanes 216 extends in a first direction from the plate 214, and a second set of vanes 246 extends in a second direction generally opposite the first direction to effect bi-directional movement of the piston 202. Further, the vanes 216, 246 are variably angled to provide the functions as described more fully below.

Generally, the displacer seals on the piston 202 provide a leak-proof barrier to prevent product from transitioning from one side of the piston 202 to the other. The seals can deteriorate based on two main causes. First, the friction of passage of the piston through the prover during normal operation can, over time, deteriorate the seal surface. The length of time to deterioration and seal failure is determined by frequency of use of the prover. The second factor that contributes to wear of the piston assembly is the gravitational forces on the seals caused by the weight of the piston. Focusing on this second factor can provide benefits.

Rotational movement of the piston about its axis, causing the piston 202 to spiral in the flow tube 204 as it is displaced, will reduce the wear factor and prolong the life of the piston seals. The rotational vanes 216, 246 provide the rotational or spiral movement of the piston 202. Introduction of flow perpendicular to the piston end will rotate the piston according to a variable angle A of the vanes. Stops may be put in the prover ends corresponding to the piston, and which are not encumbered by the vanes. The stops prevent the vanes from being distorted by the piston coming to rest at the end of the flow tube or prover barrel.

The teachings of the embodiments described herein may be employed in any suitable combination. The disclosure is not limited to the specific embodiments and combinations described herein. The teachings herein include a direct meter proving method, such that fluid flowing to the meter is diverted directly to the prover despite the fluids being at very low temperatures that cannot be managed by current piston and compact provers. The fluid may be directed through the prover and then downstream to piping that re-introduces the product into the carrying pipeline. While not common, the prover sometimes is located upstream of the meter such that the flow is directed to the prover and then flows through the meter. The purpose of the prover is to provide a known volume to compare to an indicated metered volume. The two volumes are then standardized using correction factors for temperature, pressure and density parameters for the product to establish a meter factor. The meter factor is derived by dividing the volume of the fluid passing through the meter (determined by the prover volume while proving) by the corresponding meter-indicated volume. The prover volume is the volume displaced between the detector switches. The prover volume is established by precisely determining the volume between detector switches (also called the base volume of the prover) by a method called the waterdraw method, as described by the American Petroleum Institute.

Accuracy of a bidirectional piston-type pipe prover and the overall measurement station, when operating at temperatures of less than −50° F., and specifically at temperatures approximating −220° F., is significantly affected by limitations in component materials. A valve, such as a 4-way valve, is unavailable for very low temperatures and therefore renders other prover types inoperable for very low temperatures. The detector sensing ring and the detector devices in provers are unsuitable for low temperature service. Self-lubricating coatings for use with non-lubrous products such as LPG are unavailable for low temperature service. The embodiments described herein address these problems and others.

Exemplary embodiments of a flow meter prover for low temperature fluids include an inlet configured to be directly coupled to a pipeline carrying the low temperature fluids, an outlet configured to be directly coupled to the pipeline carrying the low temperature fluids, a flow tube coupled between the inlet and the outlet, and a displacer moveable in a flow passage of the flow tube, wherein the flow tube and the displacer are configured to receive the low temperature fluids. In an embodiment, the prover further includes a magnetic pickup coil coupled to the flow tube and a magnetic member coupled to the displacer communicating with the magnetic pickup coil via magnetic reluctance. The displacer may be a piston and the magnetic member may be a target ring wrapped around the piston. In another embodiment, the prover includes a magnetic pickup coil coupled to the flow tube and a carbon-free target member coupled to the displacer communicating with the magnetic pickup coil. The carbon-free target member may include at least one of high mu ($\mu$) metal, HYMU metal, and HYMU 80 metal. The carbon-free target member may include a combination of nickel, iron, copper and/or molybdenum. In a further embodiment, the prover includes a pair of ultrasonic transceivers coupled to the flow tube and communicating a signal across the flow passage in the flow tube and wherein the displacer is moveable in the flow passage to interrupt the signal.

In some embodiments, the flow passage of the prover includes an inner surface having a microfinish. The microfinish maintains a microscopic film of the low temperature fluids between the flow passage inner surface and the displacer for lubrication. The microfinish may be in the range of 32 microinch to 16 microinch. The microfinish may be obtained by at least one of honing, milling, and grinding the inner surface. In other embodiments, the displacer includes a vane disposed at an angle relative to the flow direction of the low temperature fluids. The displacer may be a piston including a set of inner vanes extending along a longitudinal axis of the piston and set an angle relative to the axis. The vane rotates the displacer in response to the flow of the low temperature fluids.

Exemplary embodiments of a flow meter prover for low temperature fluids include a flow tube having a flow passage therein and a magnetic pickup coil mounted thereon and a piston disposed in the flow passage and including a carbon-free magnetic member, wherein the piston is moveable to move the magnetic member past the magnetic pickup coil and communicate with the magnetic pickup coil via magnetic reluctance. An inner surface of the flow passage may include a microfinish to maintain a microfilm of lubricating fluid. The piston includes a set of piston rotating vanes. In further embodiments, the prover includes a pair of ultrasonic transceivers disposed on the flow tube and communicating across the flow passage, and wherein the piston movement interrupts the ultrasonic transceiver communication.

Exemplary embodiments of a system for proving low temperature fluids include a pipeline carrying the low temperature fluids, a prover coupled into the pipeline and receiving the low temperature fluids, wherein the prover includes a flow tube including a piston moveably disposed therein and at least one of a magnetic pickup coil and a pair of ultrasonic transceivers coupled to the flow tube and communicating with the piston. The low temperature fluids include a temperature of less than about −50° F., and alternatively a temperature of less than about −220° F. In an embodiment, the piston includes a carbon-free magnetic target member. An inner surface of the flow tube may include a microfinish to maintain a microfilm of lubricating fluid. The piston may be rotatable while being moved axially.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A flow meter prover for low temperature fluids comprising:
    an inlet configured to be directly coupled to a pipeline carrying the low temperature fluids;
    an outlet configured to be directly coupled to the pipeline carrying the low temperature fluids;
    a flow tube coupled between the inlet and the outlet;
    a displacer moveable in a flow passage of the flow tube;
    wherein the flow tube and the displacer are configured to receive the low temperature fluids; and
    at least one of a magnetic pickup coil and a pair of transceivers coupled to the flow tube;
    wherein the displacer is configured to communicate with the at least one of the magnetic pickup coil and the pair of transceivers;
    wherein the displacer includes a vane disposed at an angle relative to the flow direction of the low temperature fluids.

2. The prover of claim 1 further comprising:
    a magnetic member coupled to the displacer communicating with the magnetic pickup coil via magnetic reluctance.

3. The prover of claim 2 wherein the displacer is a piston and the magnetic member is a target ring wrapped around the piston.

4. The prover of claim 1 further comprising:
    a carbon-free target member coupled to the displacer communicating with the magnetic pickup coil.

5. The prover of claim 4 wherein the carbon-free target member comprises at least one of high mu ($\mu$) metal, HYMU metal, and HYMU 80 metal.

6. The prover of claim 4 wherein the carbon-free target member comprises a nickel alloy, an iron alloy, a molybdenum alloy, or any combination of nickel, iron or molybdenum.

7. The prover of claim 1 wherein:
    the pair of transceivers communicate a signal across the flow passage in the flow tube; and
    the displacer is moveable in the flow passage to interrupt the signal.

8. The prover of claim 1 wherein the flow passage includes an inner surface having a microfinish.

9. The prover of claim 8 wherein the microfinish maintains a microscopic film of the low temperature fluids between the flow passage inner surface and the displacer for lubrication.

10. The prover of claim 8 wherein the microfinish is in the range of 32 microinch to 16 microinch.

11. The prover of claim 1 wherein the displacer is a piston including a set of inner vanes extending along a longitudinal axis of the piston and set at an angle relative to the axis.

12. The prover of claim 1 wherein the vane rotates the displacer in response to the flow of the low temperature fluids.

13. The prover of claim 1 wherein the low temperature fluids include a temperature of less than about −50° F.

14. The prover of claim 1 wherein the pair of transceivers comprises a pair of ultrasonic transceivers.

15. The prover of claim 1 wherein the low temperature fluids include at least one of liquid natural gas (LNG), liquid nitrogen, liquid butane, liquid propane, and liquefied petroleum gas (LPG).

16. A flow meter prover for low temperature fluids comprising:
- a flow tube having a flow passage therein and a magnetic pickup coil mounted thereon; and
- a piston disposed in the flow passage and including a carbon-free magnetic member;
- wherein the piston is moveable to move the magnetic member past the magnetic pickup coil and communicate with the magnetic pickup coil via magnetic reluctance;
- wherein an inner surface of the flow passage includes a microfinish configured to maintain a lubricating microfilm of the low temperature fluids;
- wherein the carbon-free magnetic member comprises at least one of high mu (μ) metal, HYMU metal, and HYMU 80 metal.

17. The prover of claim 16 wherein the piston includes a set of piston rotating vanes.

18. The prover of claim 16 further comprising:
- a pair of ultrasonic transceivers disposed on the flow tube and communicating across the flow passage; and
- wherein the piston movement interrupts the ultrasonic transceiver communication.

19. A system for proving low temperature fluids comprising:
- a pipeline carrying the low temperature fluids;
- a prover coupled into the pipeline and receiving the low temperature fluids, wherein the prover comprises:
  - a flow tube including a piston moveably disposed therein; and
  - at least one of a magnetic pickup coil and a pair of transceivers coupled to the flow tube;
  - wherein the piston is configured to communicate with the at least one of the magnetic pickup coil and the pair of transceivers;
  - wherein an inner surface of the flow tube includes a microfinish configured to maintain a lubricating microfilm of the low temperature fluids;
  - wherein the piston is configured to rotate while being moved axially.

20. The system of claim 19 wherein the pair of transceivers comprises a pair of ultrasonic transceivers.

21. The system of claim 19 wherein the low temperature fluids include a temperature of less than about −220° F.

22. The system of claim 19 wherein the piston includes a carbon-free magnetic target member.

* * * * *